Sept. 6, 1932.   F. O. WELLS   1,875,362
METHOD OF FORMING THREAD CUTTING TAPS
Filed Oct. 25, 1929   3 Sheets-Sheet 1
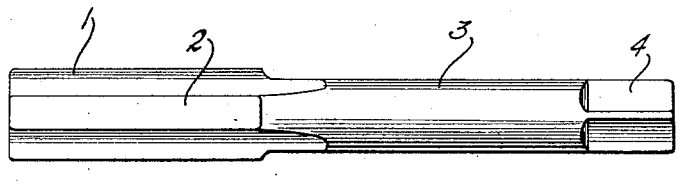
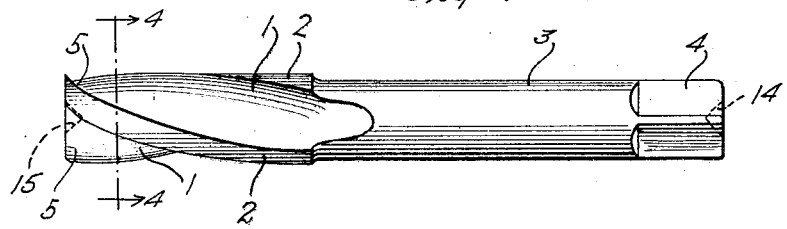
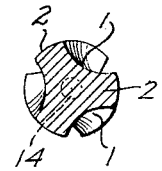
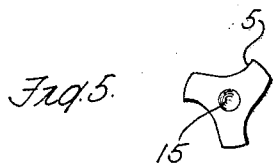
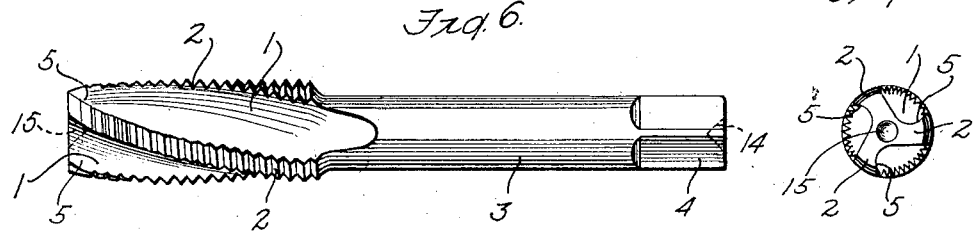
Frank O. Wells INVENTOR
BY Janney, Blair and Curtis
ATTORNEY Sept. 6, 1932.  F. O. WELLS  1,875,362
METHOD OF FORMING THREAD CUTTING TAPS
Filed Oct. 25, 1929  3 Sheets-Sheet 2

Frank O. Wells INVENTOR

BY Janney, Blair and Curtis
ATTORNEY

Sept. 6, 1932.   F. O. WELLS   1,875,362
METHOD OF FORMING THREAD CUTTING TAPS
Filed Oct. 25, 1929   3 Sheets-Sheet 3
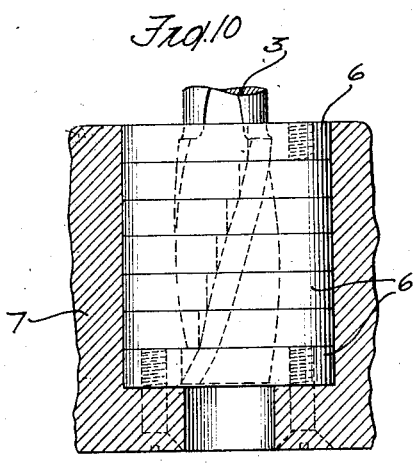
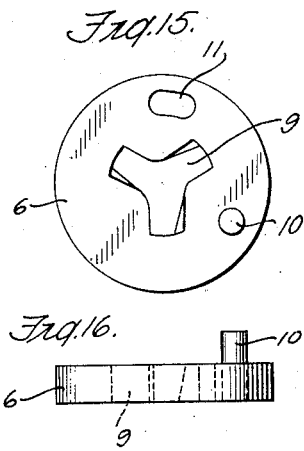
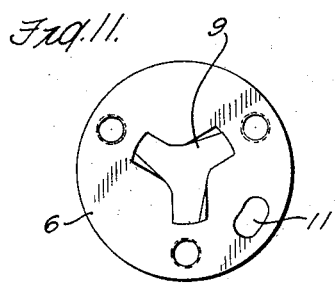
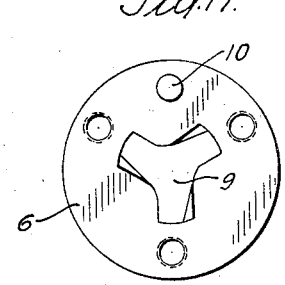
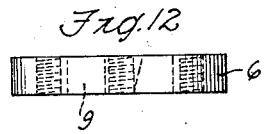
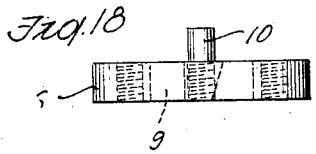
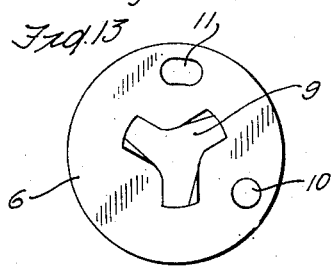
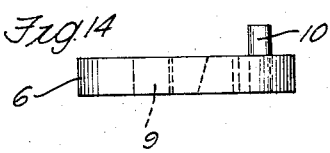

Patented Sept. 6, 1932

1,875,362

UNITED STATES PATENT OFFICE

FRANK O. WELLS, OF GREENFIELD, MASSACHUSETTS

THE METHOD OF FORMING THREAD CUTTING TAPS

Application filed October 25, 1929. Serial No. 402,338.

This invention relates to thread cutting taps and the method of making the same.

Among other objects the invention is intended to provide an efficient and durable thread cutting tap, and to provide an efficient and economical process of making thread cutting taps.

Heretofore thread cutting taps have been produced from a rod or bar of steel by expensive milling operations; such operations not only requiring much time and labor but also resulting in a considerable loss of material. The present invention contemplates the production of thread cutting taps by first forging a tap blank having as the immediate result of the forging operation the production of parallel lands and flutes formed thereon, then twisting the lands and flutes while hot, then cutting threads on the lands, then finishing and hardening the tap.

The present invention also contemplates the production of a spiral tap having increased cutting efficiency and more extended chip receiving recesses, thereby reducing the resistance of the tap to turning and increasing the life of the tap.

The invention will be clearly understood by reference to the drawings in which:

Fig. 1 is a plan view of a three-fluted tap blank forged from a rod or bar of steel.

Fig. 2 is an end view seen from the left in Fig. 1.

Fig. 3 is a plan view of the tap blank after the flutes and lands have been twisted into spiral form.

Fig. 4 is a section taken on the line 4—4 of Fig. 3.

Fig. 5 is an end view seen from the left in Fig. 4.

Fig. 6 is a plan view of the completed tap.

Fig. 7 is an end view seen from the left in Fig. 6.

Fig. 10 is a front elevation partly in section of a portion of the machine of Fig. 8 showing the tap completely twisted.

Fig. 11 is a top plan view of the uppermost twisting plate.

Fig. 12 is a front elevation of the same.

Fig. 13 is a top plan view of one of the intermediate twisting plates.

Fig. 14 is a front elevation of the same.

Fig. 15 is a top plan view of the twisting plate which lies immediately above the lowermost twisting plate.

Fig. 16 is a front elevation of the same.

Fig. 17 is a top plan view of the lowermost twisting plate.

Fig. 18 is a front elevation of the same.

Figure 8:
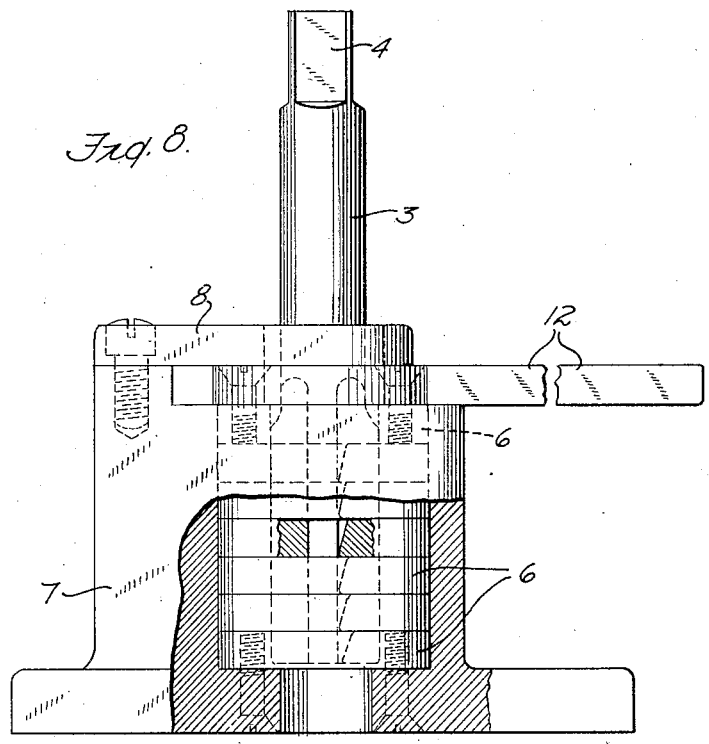
Fig. 8 is a front elevation partly in section of a suitable machine for twisting the flutes and lands of the tap blank and showing a tap blank therein prior to the twisting operation.
Figure 9:
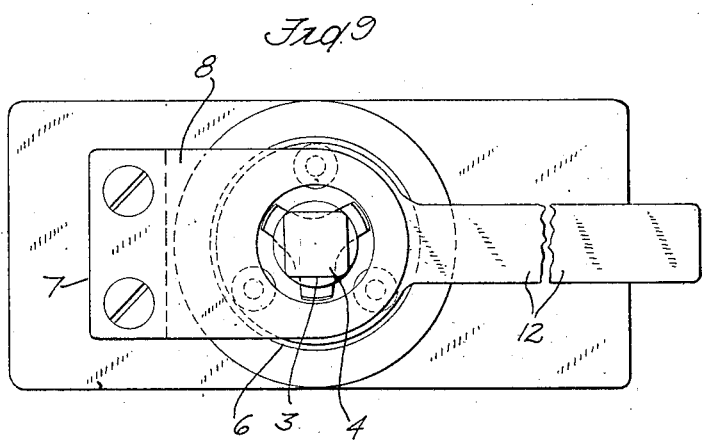
Fig. 9 is a top plan view of the same.

As best shown in Figs. 6 and 7 the thread cutting tap selected for illustration is a right hand three-flute spiral tap comprising spiraled flutes 1, spiraled lands 2 provided with cutting threads, a shank 3 and a squared end 4.

To increase the cutting efficiency of the threads and to provide additional chip room the angle of the spiral at the tip of the tap is increased in the manner hereinafter explained, thus providing the recesses shown at 5 in Fig. 7.

The tap just described is preferably produced by a series of steps now to be described.

A steel rod or bar suitably heated is subjected to the operation of a drop forging machine having forging dies adapted to produce the tap blank shown in Figs. 1 and 2; said blank having as the immediate result of the forging operation the flutes 1 and lands 2 located axially of the blank, the shank 3 and squared end 4.

Following the forging operation and while the blank is in softened condition, the flutes 1 and lands 2 are twisted into the spiral form shown in Figs. 3 and 4, an increased twist being given the tip of the tap blank to provide the recesses shown at 5 in Fig. 5.

Following the twisting operation the spiral blank shown in Fig. 3 is annealed and provided with centering recesses 14 and 15 for turning the blank. The blank is then turned, relieved, threaded, ground, tempered and polished to reproduce the finished tap shown in Fig. 6.

A suitable machine for performing the twisting operation is shown in Figs. 8 to 18 inclusive. As there shown, the machine comprises generally a number of superimposed twisting plates 6 rotatable relatively and adapted to receive and twist the flutes and lands of the tap blank. Twisting plates 6 are supported and positioned by a frame 7 provided at its top with a retainer member 8 bolted to the frame 7.

Each plate 6 is provided with a centrally located opening 9, shaped as shown, to receive the flutes and lands of the tap blank. The lowermost plate 6 is bolted to the base of the frame and is provided with an upwardly extending pin 10, which extends into a slot 11 formed in the plate 6 which lies immediately above the lowermost plate. Each plate 6, except the lowermost plate, is provided with a slot 11 and each plate 6, except the uppermost plate, is provided with a pin 10 to extend into the slot 11 of its adjacent plate. Relative movement of adjacent plates 6 is limited by the length of the slots 11. The length of the slots 11 is preferably the same in all of the plates 6 except that plate which lies immediately above the lowermost plate, and in said plate the slot 11 is longer to produce the increased twist at the tip of the tap blank. The uppermost plate 6 is bolted to a handle 12.

The operation of the machine is as follows:

With the parts in the position shown in Fig. 8, the handle 12 is moved in a contra-clockwise direction to the limit of its movement. Such movement of the handle 12 moves with it the uppermost plate 6, to which the handle is bolted. By reason of the pin and slot connections between the plates 6, each plate except the lowermost plate joins at successive intervals the rotating movement of the uppermost plate. Because the lowermost plate is bolted to the base of the frame 7, the tip of the tap blank is held thereby against movement, and the movement of the other plates twists the flutes and lands of the tap blank into spiral form. Because of the increased length of the slot 11 in the plate which lies immediately above the lowermost plate, relative movement beween said two plates is greater than the relative movement between any other two plates, thereby producing the increased twist at the tip of the tap blank.

Among other advantages the invention provides an efficient and durable tap and an inexpensive method of producing the same. Forging the tap blank to produce the lands and flutes of the tap reduces substantially the labor and material cost. Twisting the blank while in softened condition further reduces the cost of production. The increased twist at the tip of the tap increases the cutting efficiency of the threads and provides enlarged chip receiving recesses. The forging operation compresses the land forming material and increases its wearing qualities.

It will be understood that the invention is not to be limited to the specific embodiment shown for illustration and that all the inventive features need not be used conjointly as the invention may be variously embodied and used in different combinations and sub-combinations, as defined in the subjoined claims.

This application is a continuation of my application Serial No. 91,926, filed March 3, 1926, insofar as it relates to matter common to the two cases.

I claim

1. The method of forming taps which consists in first forging from a rod or bar a tap blank having at one end grooves running parallel to the axis of the blank and at the other end a cylindrical shank provided with a squared extremity, twisting the grooved part of the blank to arrange the grooves at an angle to the axis of the blank, annealing the blank, centering the blank, turning the fluted blank down to the required size and relieving the lands and flutes, cutting threads on the relieved lands, grinding the blank to the correct size, and hardening and polishing the blank.

2. The method of forming thread cutting taps which consists in forging from a rod or bar in suitable dies at one operation a tap blank having an enlarged part provided with flutes and lands, a shank part and a squared end part, then, while the blank is still hot, imparting a twist to the enlarged part of the blank to form spiraled flutes and lands, annealing the blank, centering the blank, cutting teeth on the lands, and grinding and hardening the blank.

3. The method of forming a thread cutting tap which consists in first forging from a round rod a plurality of parallel grooves and flutes, then, while the rod is still hot imparting a twist to the grooves by retaining the forged grooved end of the rod in a fixed position, and imparting a rotary motion to the other end of the rod through a fixed arc to produce a greater twist at its fixed end, annealing the blank, then turning, centering the blank, turning the flutes to a fixed size, relieving the lands, cutting the threads on the relieved lands, grinding the blank, and hardening and polishing the blank.

4. The method of forming thread cutting taps which is characterized by forging a tap blank having as the immediate result of the forging operation a plurality of parallel flutes and lands, then successively twisting different portions of the length of the flutes and lands into spiral forms, then increasing the twist at the outer ends of the flutes and lands, cutting threads on the lands, and finishing and hardening the tap.

In testimony whereof, I have signed my name to this specification this 16th day of October, 1929.

FRANK O. WELLS.